(No Model.)
D. R. PRYOR.
PIPE COUPLING.
No. 435,711. Patented Sept. 2, 1890.
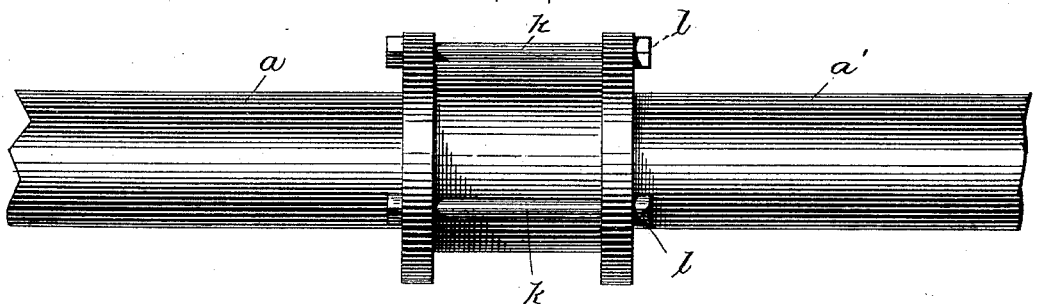
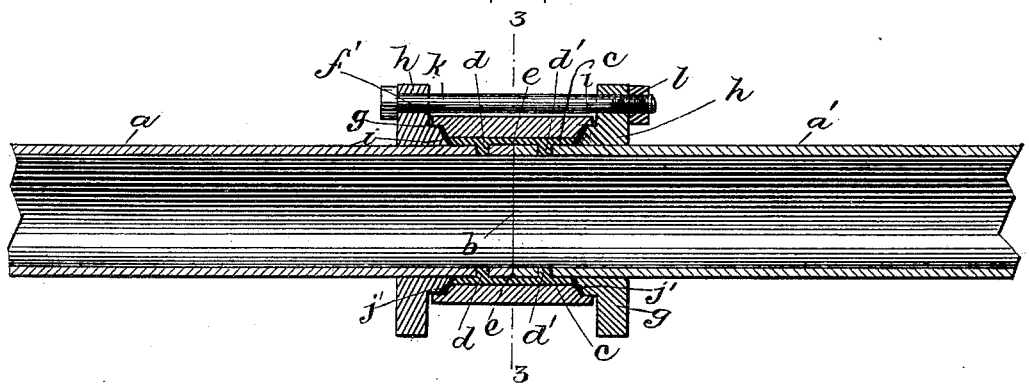
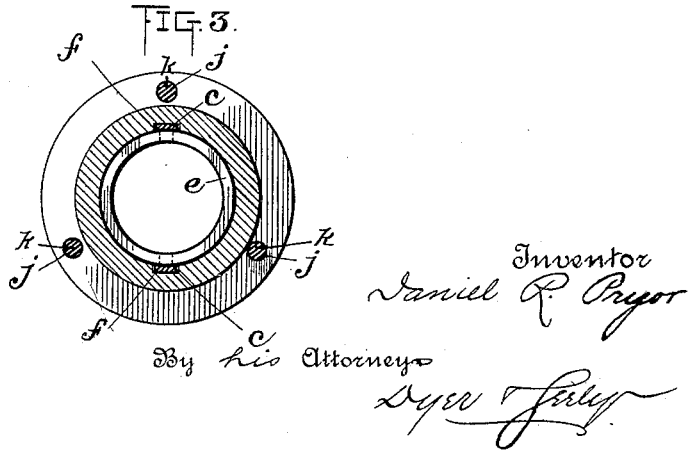

UNITED STATES PATENT OFFICE.

DANIEL R. PRYOR, OF McKEESPORT, PENNSYLVANIA.

PIPE-COUPLING.

SPECIFICATION forming part of Letters Patent No. 435,711, dated September 2, 1890.

Application filed May 27, 1889. Serial No. 312,205. (No model.)

*To all whom it may concern:*

Be it known that I, DANIEL R. PRYOR, a citizen of the United States, residing at McKeesport, in the county of Allegheny and State of Pennsylvania, have invented a certain new and useful Improvement in Pipe-Couplings, of which the following is a specification.

My invention relates to couplings for pipes or tubes, and especially to couplings for pipes of oil and gas pipe lines where an air-tight joint is necessary between the ends of the pipes.

The object of my invention is to produce a coupling which shall be simple and cheap in construction and application and efficient in operation and which will not require the use of solder or cement in the formation of the joints.

The invention consists in joining the ends of the pipe-sections to be coupled by one or more double-ended hooks, surrounding said hooks by a grooved tight-fitting collar to hold them in place, providing the collar at each end with a packing of rubber or other similar material and forcing the packing into place by means of annular disks surrounding the pipe—one at each end of the collar—drawn together by bolts or other suitable means.

In the accompanying drawings, forming a part of this specification, Figure 1 is a view in elevation of my improved coupling; Fig. 2, a central vertical longitudinal section of the same, and Fig. 3 a cross-section taken on the plane of the line 3 3 of Fig. 2.

$a$ $a'$ are the pipes, the ends of which are coupled.

$b$ represents the abutting edges of the pipes when secured in position by the coupling.

$c$ $c$ are the coupling-hooks, one or more of which are used, according to the dimensions of the pipes and the strain they may be subjected to. These hooks are double-ended, as shown, having the points $d$ $d'$ projecting downward from them adapted to engage with holes or depressions in the pipes $a$ $a'$, arranged so that when the point $d$ is in engagement with the hole or depression of the pipe $a$ the hole or depression in the pipe $a'$ may be brought into position, so that the engagement of the point $d'$ with it may be effected, thereby coupling the two pipes $a$ and $a'$ together.

$e$ is a collar fitting the pipe closely, provided with internal longitudinal grooves $f$ of sufficient depth to slip over the hook $c$, arranged at determined distances apart for engagement with the hooks. The hooks $c$ and the closely-fitting grooved collar $e$ together form what may be termed the "lock" of the coupling. This collar $e$ is preferably provided with an annular beveled recess at each end so formed as to leave a shoulder $f'$.

$h$ $h$ are annular disks, each preferably provided with a circular rib $i$, adapted to enter the recess of the collar, the end of this rib being beveled reversely to the bevel of the recess of the collar and its top forming a seat for the shoulder $f'$. These disks $h$ $h$ have a series of bolt-holes $j$ $j$ $j$. One of these disks is applied to each end of the collar $e$ with its beveled rib opposite the recess of the collar. Between the beveled rib of each of the disks $h$ and the adjacent end of the collar $e$ is interposed a gasket $j'$, of rubber or other suitable material, the gasket $j'$ and the beveled rib and recess forming the gas-fit of the coupling.

$k$ $k$ are bolts adapted to pass through the bolt-holes $j$, screw-threaded at one end, as shown, and provided with nuts $l$ for the purpose of tightening the same.

The hooks $c$ $c$ extend to the ends of the collar, so as to be reached or touched by the disks $h$ for the purpose of locking the collar, and thereby the entire coupling, in place.

The method of applying my improved coupling is as follows: The ends of the pipes $a$ and $a'$ having been brought together, the extremities of the double-ended hooks $c$ are inserted in place in the holes or depressions in the pipes. The collar $e$ is then slipped over the hooks, which enter the grooves $f$, so that such collar fits the pipes closely and serves to hold the hooks securely in place. The gaskets $j'$ are then placed in position in the recesses of the collar, and the disks $h$ are drawn together by means of the bolts $k$ and the nuts $l$, forcing the rib $i$ into the recess of the collar, thereby compressing the packing and forming a tight joint.

It will be seen that the coupling above described may be quickly and readily applied and does not require the use of solder or cement to secure it against leakage, and that it may be readily taken apart and reapplied; also, that by means of the closely-fitting collar the strain is removed from the gas-fit to the couplings, so that if from any cause—side or vertical pull or pressure—the pipes should separate the gas-fit would remain tight and prevent leakage.

What I claim is—

1. The combination to form a pipe-coupling of two sections of pipe each provided with holes, indentations, or depressions, one or more double hooks adapted to enter such holes, indentations, or depressions, a grooved collar having recessed ends, a disk on each of said pipe-sections having a rib adapted to enter said recessed ends of the collar, a gasket-packing, and means for drawing the disks together to tighten the packing between the ribs and recesses, substantially as set forth.

2. The combination to form a pipe-coupling of two sections of pipe each provided with holes, one or more double hooks adapted to enter such holes, a grooved close-fitting collar having recessed beveled ends, a disk on each of said pipe-sections having a rib reversely beveled on the end adapted to enter said recessed ends of the collar, a gasket-packing, and means for drawing the disks together to tighten the packing between the ribs and recesses and to lock the coupling, substantially as set forth.

This specification signed and witnessed this 22d day of May, 1889.

DANIEL R. PRYOR.

Witnesses:
EDWIN SOLES,
MAGNUS PFLAUM.